(12) United States Patent
Devriendt et al.

(10) Patent No.: US 11,314,431 B2
(45) Date of Patent: Apr. 26, 2022

(54) DISTRIBUTED DATA BLOCKS USING STORAGE PATH COST VALUES

(71) Applicant: Western Digital Technologies, Inc., San Jose, CA (US)

(72) Inventors: Stijn Devriendt, Knesselare (BE); Sam De Roeck, Ghent (BE); Arne De Coninck, Erpe-Mere (BE)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/684,314

(22) Filed: Nov. 14, 2019

(65) Prior Publication Data

US 2021/0149563 A1 May 20, 2021

(51) Int. Cl.
*G06F 3/06* (2006.01)

(52) U.S. Cl.
CPC .............. *G06F 3/064* (2013.01); *G06F 3/067* (2013.01); *G06F 3/0619* (2013.01); *G06F 3/0635* (2013.01); *G06F 3/0653* (2013.01); *G06F 3/0661* (2013.01)

(58) Field of Classification Search
CPC ...... G06F 3/064; G06F 3/0619; G06F 3/0635; G06F 3/0653; G06F 3/0661; G06F 3/067
USPC ........................................................ 711/117
See application file for complete search history.

(56) References Cited

U.S. PATENT DOCUMENTS

| | | | |
|---|---|---|---|
| 8,433,849 B2* | 4/2013 | De Schrijver | G06F 11/2094 711/114 |
| 8,738,582 B2 | 5/2014 | De Schrijver et al. | |
| 8,995,301 B1* | 3/2015 | Miller | H04L 45/14 370/254 |
| 9,479,587 B2 | 10/2016 | Bestler et al. | |
| 9,501,244 B2 | 11/2016 | Hayes et al. | |
| 10,078,552 B2 | 9/2018 | De Keyser et al. | |
| 11,112,978 B2 | 9/2021 | Danilov et al. | |
| 2009/0320033 A1 | 12/2009 | Gokhale et al. | |
| 2009/0320037 A1 | 12/2009 | Gokhale et al. | |
| 2014/0122441 A1 | 5/2014 | Vervaet et al. | |
| 2015/0281352 A1* | 10/2015 | Nakatsugawa | H04L 67/1097 709/217 |
| 2015/0324233 A1 | 11/2015 | Gokhale et al. | |
| 2017/0195420 A1* | 7/2017 | Resch | G06F 3/0608 |
| 2017/0339622 A1 | 11/2017 | Condeixa et al. | |
| 2019/0196728 A1 | 6/2019 | Feng | |
| 2020/0125282 A1 | 4/2020 | Fisher et al. | |
| 2020/0250080 A1* | 8/2020 | Yao | G06F 3/0611 |
| 2021/0103391 A1 | 4/2021 | Wolter et al. | |
| 2021/0149563 A1 | 5/2021 | Devriendt et al. | |
| 2021/0271418 A1 | 9/2021 | Su | |

* cited by examiner

Primary Examiner — William E. Baughman
(74) Attorney, Agent, or Firm — Patent Law Works LLP

(57) ABSTRACT

Example distributed storage systems, controller nodes, and methods provide distributed and redundant data blocks accessed based on storage path cost values. Storage elements are accessible through hierarchical storage paths traversing multiple system components. Data blocks are distributed among the storage elements. System costs are calculated based on the storage path for reaching each storage element and a storage path is selected based on a comparison of the system costs for each storage element. Data blocks are accessed through the selected storage path.

20 Claims, 8 Drawing Sheets

DISTRIBUTED DATA BLOCKS USING STORAGE PATH COST VALUES

TECHNICAL FIELD

The present disclosure generally relates to data storage, and in a more particular example, to distribution of data blocks in a fault tolerant manner with a predetermined level of redundancy in a distributed storage system.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

Large-scale storage systems generally distribute the stored data over multiple storage elements, such as for example solid state drives, or multiple components such as storage nodes comprising a plurality of such storage elements. However, as the number of storage elements in such a distributed storage system increase, the probability of failure of one or more of these storage elements increases, as does the probability of failure or interruption of controller, network, and interface components. To cope with these issue, distributed storage systems generally use some level of redundancy at the data, storage node, controller, interface, client, and network levels.

As redundancy and complexity in distributed storage systems increase, it may be an increasing challenge to allocate storage resources, including processing, memory, and network resources to specific storage operations. For any given storage request, there may be a number of storage nodes containing the target data and each node may be reached by a different data path with different resource constraints. Further, the dynamic nature of the storage environment means that the costs associated with each path or resource may vary based on load, service interruptions, storage management activities, etc. Differing system configurations, applications, and organization may also have differing standards on how cost, time, reliability, and other factors are prioritized when allocating storage resources.

As large-scale storage systems scale and create distributed storage systems supporting storage requests across diverse storage paths, reliable and efficient implementations for dynamically selecting storage paths based on their associated costs may be needed.

SUMMARY

Various aspects for distributed and redundant data block storage, particularly, using storage path cost values to determine where data blocks should be stored and accessed are described.

One general aspect includes a system that includes: a block spreader configured to distribute, based on a spreading policy, a plurality of data blocks to a plurality of storage elements distributed among a plurality of storage nodes; a storage path estimator configured to calculate at least one system cost value for each storage element of the plurality of storage elements storing the plurality of data blocks; a storage path selector configured to select, based on a comparison of the at least one system cost value for each storage element, a subset of the plurality of data blocks from which a data object is recoverable; and a block clusterer configured to retrieve the subset of the plurality of data blocks. The plurality of storage elements is configured to store the plurality of data blocks and the plurality of data blocks corresponds to the data object.

Implementations may include one or more of the following features. The system may further include: an encoder configured to disassemble the data object into a predetermined number of redundant data blocks equal to a number of the plurality of data blocks; and a decoder configured to assemble the data object from the subset of the plurality of data blocks. The storage path estimator may be configured to identify, using a hierarchical address, each storage element of the plurality of storage elements, and the hierarchical address may include a plurality of hierarchy level identifiers corresponding to a hierarchical path from at least one controller node to a selected storage element. The plurality of hierarchy level identifiers may be selected from a storage element identifier, a storage node identifier, a storage rack identifier, a storage cluster identifier, a storage site identifier, and a storage system identifier. The hierarchical address may include at least three hierarchy levels. The system may further include a system data collector configured to receive a plurality of system parameters for each storage element of the plurality of storage elements. The storage path estimator may be further configured to use the plurality of system parameters to calculate the at least one system cost value for each storage element. A storage path for each storage element of the plurality of storage elements may be configured to include a plurality of hierarchy levels corresponding to different system components. The system data collector may be further configured to receive the plurality of system parameters for the storage path for each storage element from different system components from at least two hierarchy levels of the plurality of hierarchy levels. The plurality of system parameters may be selected from processing cost, memory cost, read/write latency, idle time, network delay, and network bandwidth. The storage path estimator may be further configured to apply a cost model for a selected set of system parameters from the plurality of system parameters to calculate the at least one system cost value for each storage element. The system may further include: the plurality of storage nodes including the plurality of storage elements, where the plurality of storage nodes further includes at least one parameter monitor configured to send at least one system parameter of the plurality of system parameters to the system data collector; at least one controller node including the block spreader, the storage path estimator, the storage path selector, the block clusterer, and the system data collector; and at least one network device interconnecting the plurality of storage nodes and the at least one controller node, where at least one system parameter of the plurality of system parameters includes a network cost associated with communication, between the at least one controller node and each storage node of the plurality of storage nodes, through the at least one network device. The system may further include a policy engine configured to receive at least one storage policy selected from a quality of service policy, a latency target policy, and a power saving policy. The storage path estimator may be further configured to apply the at least one storage policy to calculating the at least one system cost value for each storage element of the plurality of storage elements. The storage path selector may be further configured to apply the at least one storage policy to selecting the subset of the plurality of data blocks from which the data object is recoverable.

Another general aspect includes a computer-implemented method that includes: disassembling a data object into a plurality of data blocks; distributing, based on a spreading policy, the plurality of data blocks to a plurality of storage elements distributed among a plurality of storage nodes; calculating at least one system cost value for each storage element of the plurality of storage elements storing the plurality of data blocks; selecting, based on a comparison of the at least one system cost value for each storage element, a subset of the plurality of data blocks from which the data object is recoverable; retrieving the subset of the plurality of data blocks; and assembling the data object from the subset of the plurality of data blocks.

Implementations may include one or more of the following features. The computer-implemented method may further include: identifying, using a hierarchical address, each storage element of the plurality of storage elements, where the hierarchical address includes a plurality of hierarchy level identifiers corresponding to a hierarchical path from at least one controller node to a selected storage element. The plurality of hierarchy level identifiers may be selected from a storage element identifier, a storage node identifier, a storage rack identifier, a storage cluster identifier, a storage site identifier, and a storage system identifier. The hierarchical address may include at least three hierarchy levels. The computer-implemented method may further include: receiving a plurality of system parameters for each storage element of the plurality of storage elements, where calculating the at least one system cost value for each storage element uses the plurality of system parameters. A storage path for each storage element of the plurality of storage elements may be configured to include a plurality of hierarchy levels corresponding to different system components. The plurality of system parameters for each storage element may correspond to the storage path for each storage element and different system components from at least two hierarchy levels of the plurality of hierarchy levels. The plurality of system parameters may be selected from processing cost, memory cost, read/write latency, idle time, network delay, and network bandwidth. Calculating the at least one system cost value for each storage element may include applying a cost model for a selected set of system parameters from the plurality of system parameters. The computer-implemented method may further include: monitoring at least one system parameter of the plurality of system parameters at each storage node of the plurality of storage nodes; and monitoring a network cost associated with communication between at least one controller node and each storage node of the plurality of storage nodes, where the network cost is at least one system parameter of the plurality of system parameters used for calculating the at least one system cost value. The computer-implemented method may further include receiving at least one storage policy selected from a quality of service policy, a latency target policy, and a power saving policy. Calculating the at least one system cost value for each storage element of the plurality of storage elements may include applying the at least one storage policy and selecting the subset of the plurality of data blocks from which the data object is recoverable may include applying the at least one storage policy. The computer-implemented method may further include: detecting a policy violation based on the comparison of the at least one system cost value for each storage element not meeting the at least one storage policy; and reducing, responsive to detecting the policy violation, incoming storage requests to the plurality of storage nodes.

Another general aspect includes a system that includes: a plurality of storage nodes including a plurality of storage elements; at least one controller node configured to communicate with the plurality of storage nodes; means for disassembling a data object into a plurality of data blocks; means for distributing, based on a spreading policy, the plurality of data blocks to the plurality of storage elements distributed among the plurality of storage nodes; means for calculating at least one system cost value for each storage element of the plurality of storage elements storing the plurality of data blocks; means for selecting, based on a comparison of the at least one system cost value for each storage element, a subset of the plurality of data blocks from which the data object is recoverable; means for retrieving the subset of the plurality of data blocks; and means for assembling the data object from the subset of the plurality of data blocks.

Implementations may include one or more of the following features. The system may further include means for receiving at least one storage policy selected from a quality of service policy, a latency target policy, and a power saving policy, where: the means for calculating the at least one system cost value for each storage element of the plurality of storage elements includes applying the at least one storage policy; and the means for selecting the subset of the plurality of data blocks from which the data object is recoverable includes applying the at least one storage policy.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the selection of storage paths for storing and accessing redundantly stored data blocks, such as by using dynamically generated system cost values for each storage path to enforce storage policy in accordance with a dynamic cost model. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
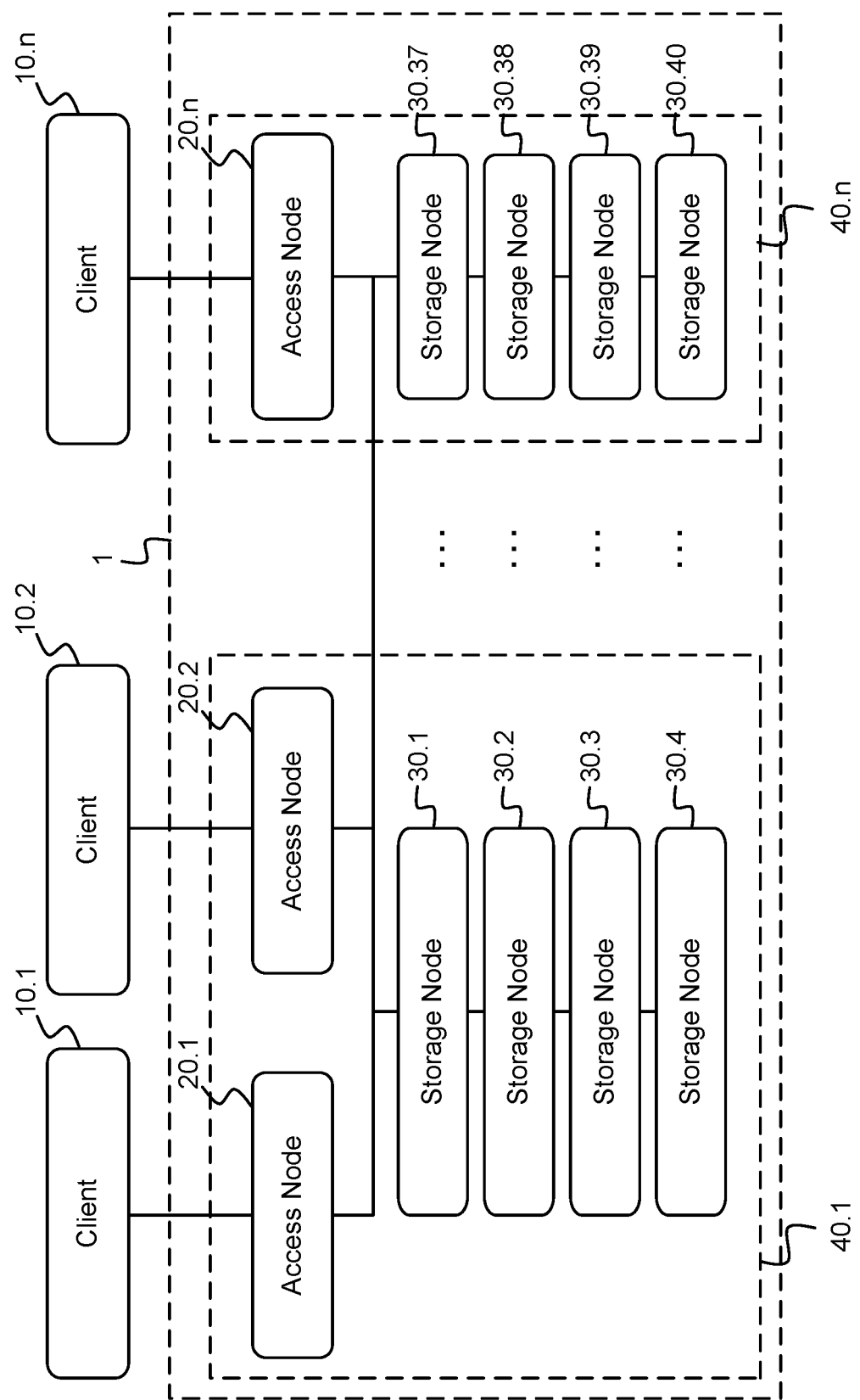
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.$n$ for accessing data objects through one or more access nodes 20.1-10.$n$. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.$n$ comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.$n$. Access nodes 20 may be located in the same or different racks as the storage nodes to which the access nodes connect. A rack may have multiple access nodes, for example rack 40.1, a single access node as rack 40.$n$, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
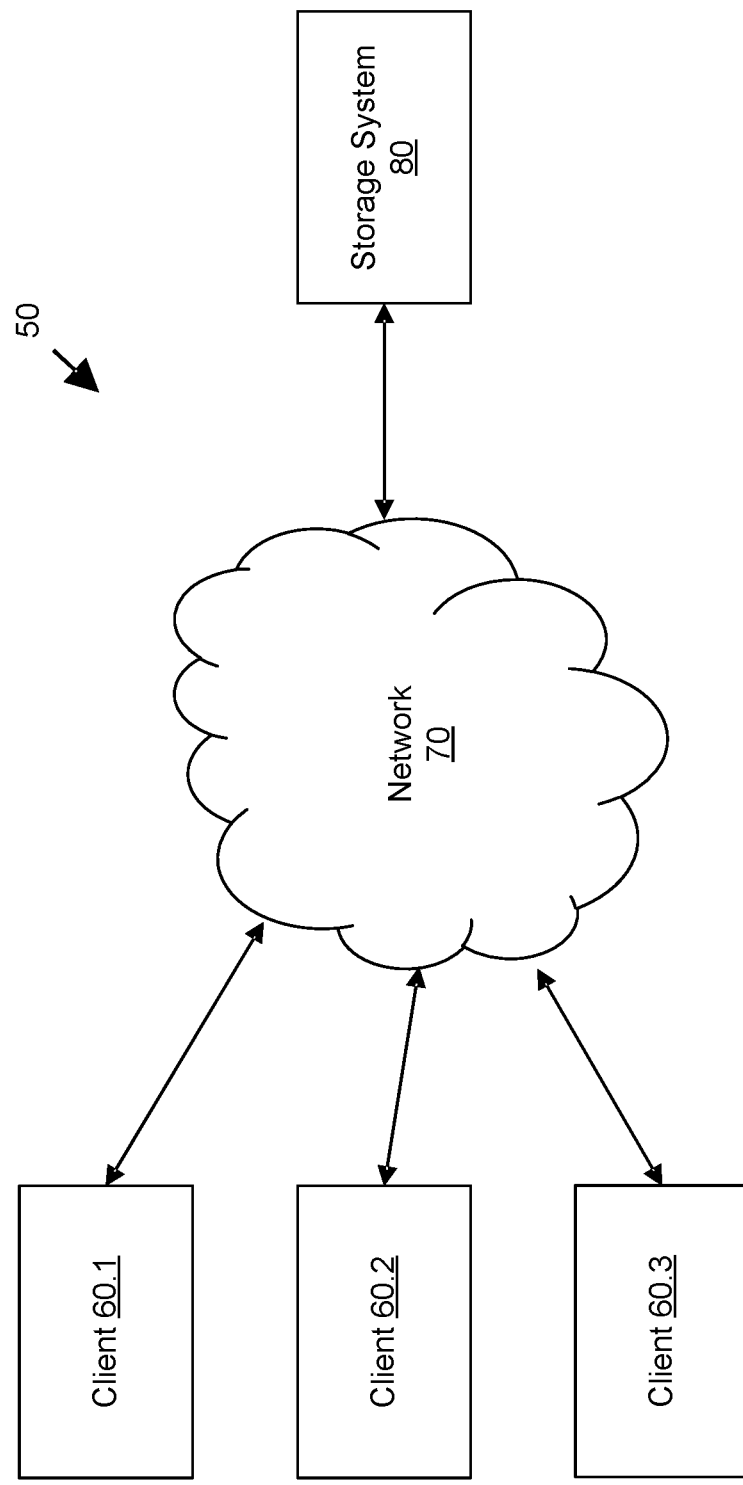
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client devices 60 and storage system 80 may comprise at least a portion of a client-server model. In general, storage system 80 can be accessed by client devices 60 and/or communication with storage system 80 can be initiated by client devices 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
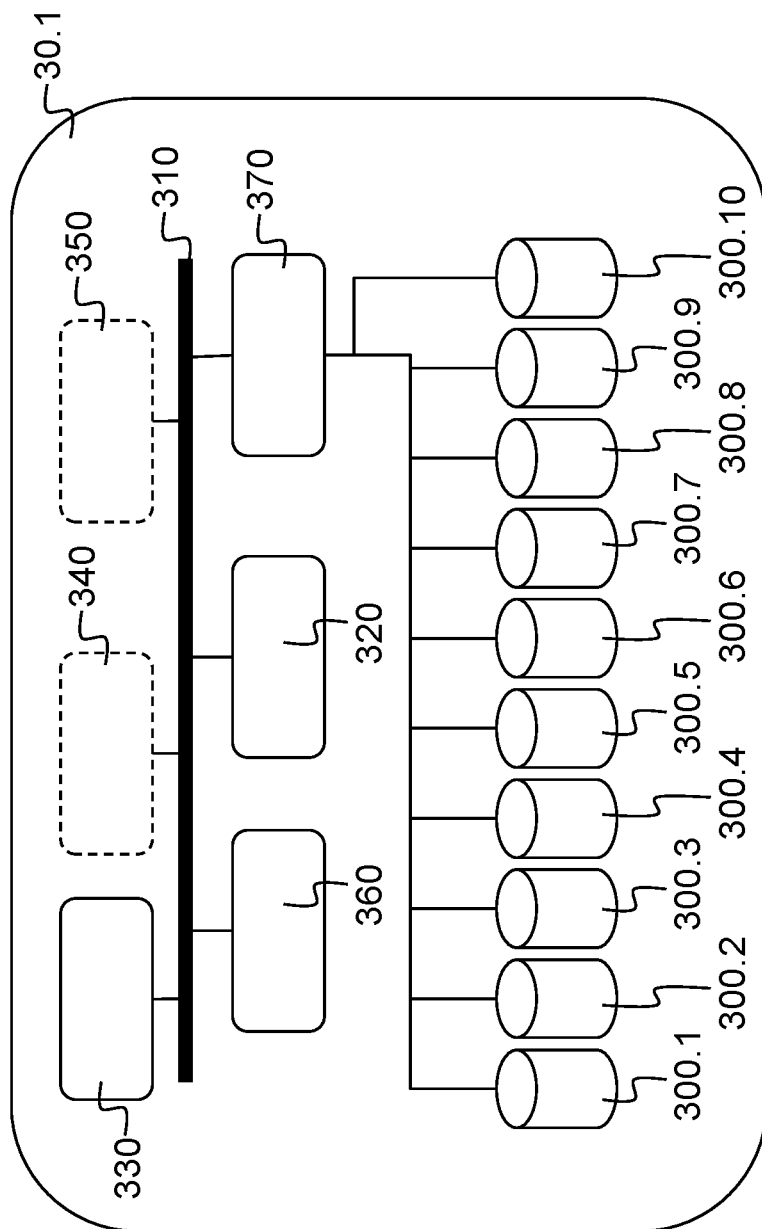
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 3 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID).

Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronized. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
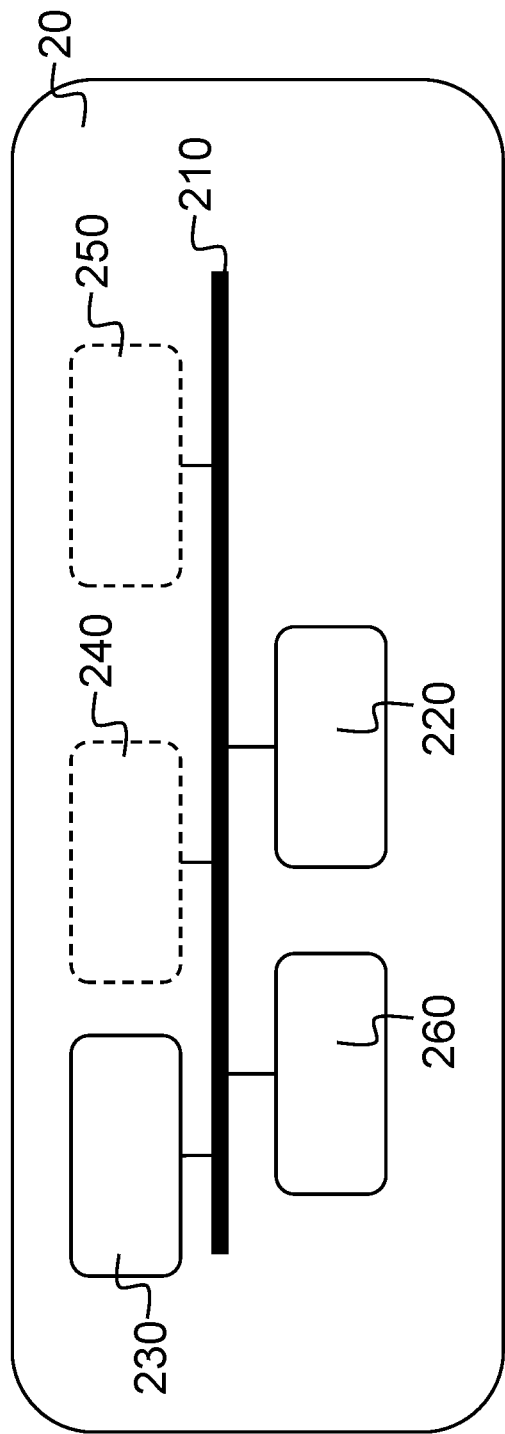
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, configuration management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
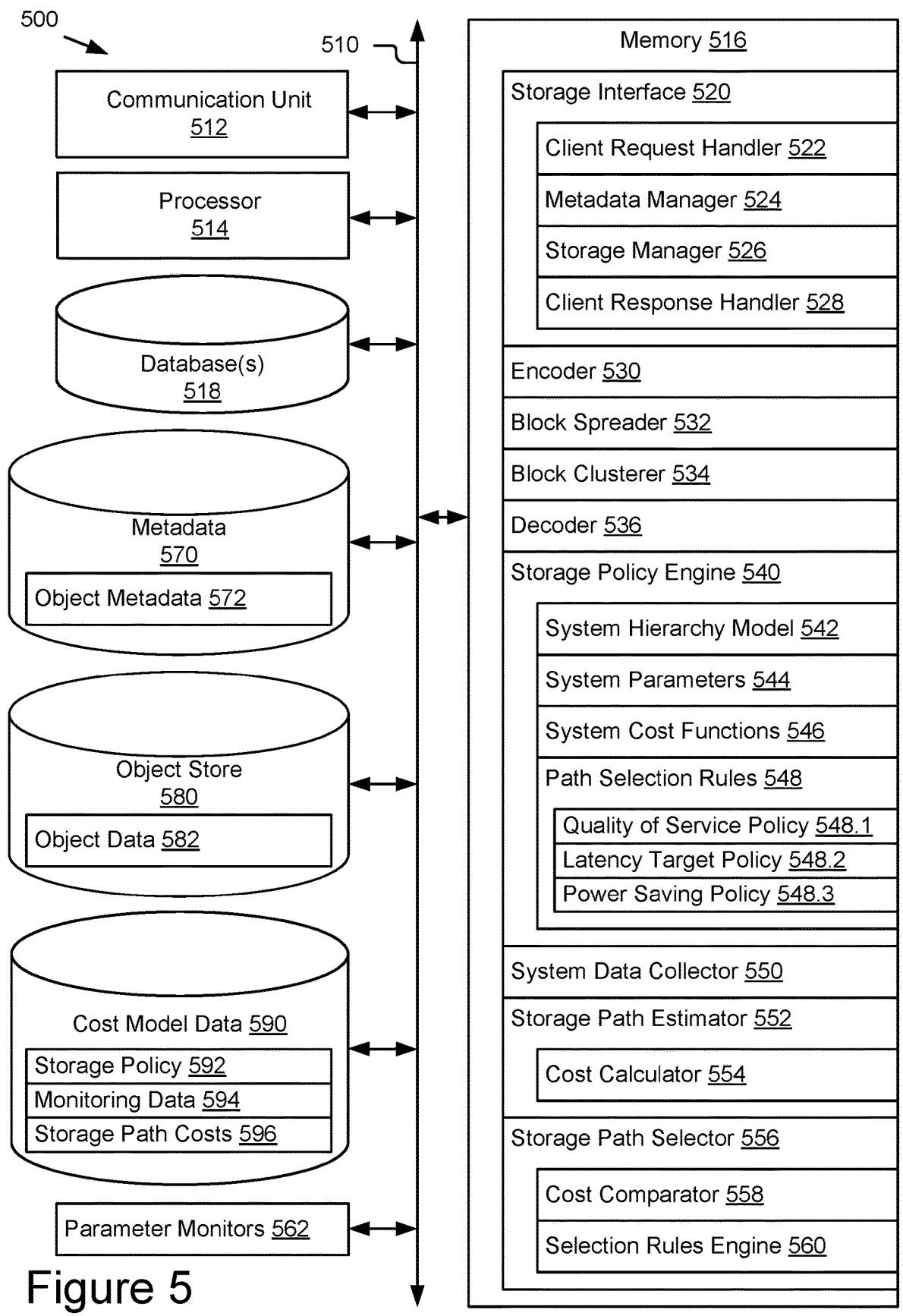
FIG. 5 schematically illustrates some example elements of an object storage system for the distributed storage system of FIG. 1.

FIG. 5 schematically shows selected modules of an access node, storage node, and/or controller node with storage management functions for distributed data block storage and access. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in a controller node 20 with object storage management functions and metadata store 570 and/or object store 580 may be embodied in one or more storage nodes 30 in communication with controller node 20.

Object storage system 500 may include a bus 510 interconnecting at least one communication unit 512, at least one processor 514, and at least one memory 516. Bus 510 may include one or more conductors that permit communication among the components of object storage system 500. Communication unit 512 may include any transceiver-like mechanism that enables object storage system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such as metadata store 570, object store 580, and/or cost model data 590. Databases may include one or more data structures for storing, retrieving, indexing, searching, filtering, etc. of structured and/or unstructured data elements. In some embodiments, metadata store 570 may be structured as reference data entries and/or data fields indexed by metadata key value entries related to data objects stored in object store 580. Object store 580 may include data objects comprised of object data (such as host data), some amount of metadata (stored as metadata tags), and a GUID. Metadata store 570, object store 580, and/or other databases or data structures may be maintained and managed in separate computing systems, such as storage nodes, with separate communication, processor, memory, and other computing resources and accessed by object storage system 500 through data access protocols. Metadata store 570 and object store 580 may be shared across multiple object storage systems 500.

Object storage system 500 may include a plurality of modules or subsystems that are stored and/or instantiated in memory 516 for execution by processor 514. For example, memory 516 may include a storage interface 520 configured to receive, process, and respond to object data requests from client systems or other nodes in distributed storage system 1. Memory 516 may include an encoder 530 configured to disassemble data objects into a plurality of data blocks, such as data shards or symbols for an erasure coding configuration. Memory 516 may include a block spreader 532 configured to distribute the data blocks among a plurality of storage nodes or storage elements according to a spreading policy. Memory 516 may include a block clusterer configured to retrieve a subset of distributed data blocks for reassembling the data object. Memory 516 may include a decoder configured to reassemble the data object from the retrieved data blocks and the encoding configuration used. Memory 516 may include a storage policy engine 540 configured to define one or more storage policies based on system cost models for use in selecting storage elements. Memory 516 may include a system data collector 550 configured to receive system cost parameters for calculation of system costs. Memory 516 may include a storage path estimator 552 configured to calculate system costs for each storage path. Memory 516 may include a storage path selector configured to select a storage element based on comparing system costs for each storage path. In some embodiments, encoder 530, block spreader 532, block clusterer 534, decoder 536, storage policy engine 540, system data collector 550, storage path estimator 552, and/or storage path selector 556 may be integrated into storage interface 520 and/or managed as separate libraries or background processes (e.g. daemon) through an API or other interface.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects and their respective client or host data and metadata in accordance with the protocols of an object storage system.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client response handler 528.

Client request handler 522 may include an interface and/or communication event-based condition for receiving object data requests from one or more clients. For example, client systems may send an object data request over a network connection and addressed to object storage system 500 or a port or component thereof. Client request handler 522 may receive these requests and parse them according to the appropriate communication and object storage protocols. For example, client request handler 522 may identify a transaction identifier, a client identifier, an object identifier (object name or GUID), a data operation, and additional parameters for the data operation, if any, from the received message or messages that make up the object data request.

Metadata manager 524 may include interfaces, functions, and/or parameters for creating, modifying, deleting, accessing, and/or otherwise managing object metadata, such as object metadata 572 stored in metadata store 570. For example, when a new object is written to object store 580, at least one new metadata entry may be created in metadata store 570 to represent parameters describing or related to the newly created object. Metadata manager 524 may generate and maintain an object data index that enables metadata manager 524 to locate object metadata within metadata store 570. For example, metadata store 570 may be organized as a key-value store and object data index may include key values for data objects and/or operations related to those objects that are indexed with a key value that include the object identifier or GUID for each object. In some embodiments, metadata manager 524 may also manage object metadata stored in object store 580 with object data 582. Metadata manager 524 may work in conjunction with storage manager 526 to create, modify, delete, access or otherwise manage object metadata stored as object tags within object store 580.

Storage manager 526 may include interfaces, functions, and/or parameters for reading, writing, and deleting object data elements in object store 580. For example, object PUT commands may be configured to write object identifiers, object data 564, and/or object tags to object store 580. Object GET commands may be configured to read data from object store 580. Object DELETE commands may be configured to delete data from object store 580, or at least mark a data object for deletion until a future garbage collection or similar operation actually deletes the data or reallocates the physical storage location to another purpose.

Other object storage commands may be handled by storage manager 526, including special functions defined for version control. Object storage commands processed by storage manager 526 may include parameters for accessing special functions and/or metadata resources stored with host or client data in the data objects. Storage manager 526 may work in conjunction with metadata manager 524 for managing object metadata, including versioning information. Storage manager 526 may operate in conjunction with encoder 530, block spreader 532, block clusterer 534, and decoder 536 for encoding and decoding data objects in redundant and distributed data blocks in accordance with an erasure coding configuration or other data redundancy method. For example, storage manager 526 may use encoder 530 and block spreader 532 to write data to object store 580 and use block clusterer 534 and decoder 536 to read data from object store 580. Encoder 530, block spreader 532, block clusterer 534, and decoder 536 may in turn use storage policy engine 540, system data collector 550, storage path estimator 552, and storage path selector 556 to select which storage elements within a given set of storage elements should be used for such write and/or read operations.

Client response handler 528 may include an interface and/or communication logic for sending response messages, such as result, status, or error messages, to one or more clients related to object data requests received. For example, client response handler 528 may wait for processing by metadata manager 524 and/or storage manager 526 to complete or generate an error, and then provide an appropriate result or error message to the client system(s) for each object data request received In some embodiments, metadata store 570 may be distributed across multiple systems, such as a plurality of access systems. Metadata store 570 and/or portions thereof may be sharded data stores, wherein the data stores are partitioned into segments stored in different computing systems. Storage interface 520 may include the functions for locating and accessing relevant portions of the sharded data base.

Encoder 530, block spreader 532, block clusterer 534, and decoder 536 may comprise an erasure coding engine configured to store data objects in accordance with a reliability policy which guarantees a level of redundancy. Encoder 530, block spreader 532, block clusterer 534, and decoder 536 may individually or collectively include an interface protocol or set of functions and parameters for distributing data blocks corresponding to data objects across designated sets of storage nodes and storage elements and reassembling those data objects from subsets of those sets (allow for failures, errors, interruptions, and optimizations). For example, object storage system 500 may correctly retrieve a data object distributed among storage elements even if a number of those storage elements have failed or are otherwise inaccessible. Encoder 530, block spreader 532, block clusterer 534, and decoder 536 may implement an erasure coding configuration to achieve the requirements of a reliability policy with less overhead than full redundancy. For example, encoder 530, block spreader 532, block clusterer 534, and decoder 536 may implement Reed-Solomon codes, fountain codes, or rateless erasure codes such as online codes, low-density parity-check (LDPC) codes, raptor codes, and numerous other coding schemes that are available.

Encoder 530 may receive a data object from storage manager 526 and disassemble the data object into a predetermined number of redundant sub blocks, all associated with the same data object identifier. The predetermined number of data blocks may correspond to a predetermined multiple of a desired spreading width, based on the sum of a minimal spreading requirement and a maximum number of concurrent failures. The maximum concurrent failures tolerance may correspond to the number of storage elements that store data blocks for the data object and are allowed to fail concurrently as determined by the reliability policy. The minimum spreading requirement may correspond to the minimum number of storage elements that must be available to reassemble the data object. Encoder 530 may use an erasure coding configuration to produce the predetermined number of data blocks. In some embodiments, each data block may comprise encoded data of equal size, such as the total data object size divided by a factor equal to a predetermined multiple of the spreading requirement. Some or all data blocks may also include decoding data, such as parity data or other decoding data.

Block spreader 532 may store the predetermined number of redundant data blocks on a number of storage elements which corresponds to the desired spreading width or more. For example, block spreader 532 may store on each storage element a predetermined multiple of data blocks such that the data blocks are evenly distributed among the storage elements. In some embodiments, these storage elements may be split across module storage nodes or even multiple storage racks, storage sites, or other layers of a hierarchical storage architecture. Block spreader 532 may implement a spreading policy that may include, for example, a number of storage elements to receive the blocks, the storage pool from which those storage elements may be selected, and constraints or algorithms for how they are to be distributed (e.g.

evenly across elements or nodes, randomly within an acceptable range, or using some other distribution method). In some embodiments, a hierarchical spreading policy may define additional rules for spreading data blocks, such as defining a number of sites, racks, etc. across which the data blocks should be spread. For example, the spreading policy may include a number of blocks per site, blocks per rack, blocks per node, blocks per element, etc. In some embodiments, block spreader 532 may invoke storage path selector 556 to select specific storage elements within a storage pool to receive one or more data blocks as further described below.

Block clusterer 534 may receive a request from storage manager 526 to retrieve a selected data object that has previously been stored through encoder 530 and block spreader 532. Based on the data object identifier, block clusterer 534 may locate a predetermined number of the redundant data blocks that were stored in the storage elements. Block clusterer 534 does not need to be able to retrieve all of the encoded data blocks in order to reassemble the data block, only a subset equal to the minimal spreading requirement. While the likelihood of outright failures corresponding to the failure tolerance is extremely low, there may be service interruptions, delays, resource bottlenecks (processing, memory, bandwidth, etc.), and other considerations that make some storage elements easier or less costly to access. Block clusterer 534 may invoke storage path selector 556 to select specific storage elements among the set of storage elements storing the data blocks corresponding to the selected data object. For example, storage path selector 556 may provide a preferred subset for retrieval or a prioritized list for enabling block clusterer 534 to choose the least costly storage elements from which to retrieve the subset of data blocks.

Decoder 536 may reassemble the selected data object from the subset of data blocks retrieved by block clusterer 534. For example, decoder 536 may apply a decoding algorithm and the decoding data from the data blocks to the encoded data in the data blocks to reassemble the selected data object from the subset of data blocks. The resulting data object may be returned to storage manager 526 and storage interface 520 to respond to a host request or other storage operation.

Storage policy engine 540 may include an interface protocol or set of functions and parameters for receiving, defining, and otherwise managing storage policies for object storage system 500 and/or a broader distributed storage system. For example, storage policy engine 540 may include functions for initiating, storing, modifying, or otherwise manipulating one or more storage policy parameters in storage policy data 592. The storage policy parameters may then be used by other components in object storage system 500 to effect data management operations, such as erasure coding configurations, spreading policies, and storage path selection. In some embodiments, storage policy engine 540 may include or interface with a graphical user interface for enabling system administrators to view, modify, and otherwise manage storage policy parameters.

In some embodiments, storage policy engine 540 may include a plurality of hardware and/or software modules configured to use processor 514 and memory 516 to handle or manage defined operations of storage policy engine 540. For example, storage interface 520 may include a system hierarchy model 542, system parameters 544, system cost functions 546, and path selection rules 548. For example, system hierarchy model 542 may define storage paths available to each storage element, system parameters 544 may define the available system management data for calculating system costs, system cost functions 546 may enable numerical modeling of system costs for each storage path, and path selection rules 548 may customize selection of relevant hierarchical components, parameter data, cost functions, comparisons, and priorities for making storage path selections. Collectively, system hierarchy model 542, selected system parameters 544, relevant system cost functions 546, and an active group of path selection rules 548 may define a dynamic cost model for selecting storage paths and may be reflected in cost model data 590. This dynamic cost model may be implemented through system data collector 550, storage path estimator 552, and storage path selector 556 in support of block spreader 532 and block clusterer 534.

System hierarchy model 542 may include data structures, functions, and interfaces for defining a hierarchical addressing scheme and related storage paths among components, such as from a controller node to the many storage elements that make up object store 580. For example, a storage pool supporting object store 580 may include a large number of storage elements grouped into storage nodes. The storage nodes may be arranged in racks or clusters using common power and networking resources, racks and clusters may be distributed across sites, from different server rooms and buildings, to geographically dispersed data centers. These layers of components, from the lowest hierarchical level of the storage elements themselves, up to one or more top-level controllers, access, or management nodes (sometimes virtualized) responsible for allocating storage requests and resulting storage operations, may define distinct failure points as well as a series or routing decisions for traversing the storage path from the top level to a target storage element. In some embodiments, a configuration data structure reflecting the storage system components, their hierarchy level, and relationship to other components may be stored in cost model data 590. In some embodiments, system hierarchy model 542 may be inherent in the physical and/or logical arrangement of components and reflected in a hierarchical addressing scheme regardless of whether the model is otherwise stored in a configuration map or similar modeling tool. An example system hierarchical model 542 is further shown and described with regard to FIG. 6.

System parameters 544 may include interfaces, functions, and/or parameters for identifying and selecting system parameters that may be collected and used for dynamic system cost calculations and comparisons. For example, system parameters 544 may include storage parameters, such as capacity, read/write latency, command queue depths, idle time, buffer space, and operational status. System parameters 544 may include quantification of computing resource availability, such as memory resources and processor resources, including special resources like direct memory access transfer buffers or hardware encoders, decoders, or parity engines. System parameters may include network parameters, such as network delay and network bandwidth, which may be measured and quantified for communications between each layer of the hierarchy, as well as aggregated into total values for a complete storage path.

In any given storage system configuration, a variety of system parameters may be available. System parameters 544 may enable the identification and selection from available parameters for supporting system cost functions 546. For example, system parameters 544 may be used to configure system data collector 550 to receive data from particular APIs, libraries, daemons, or services or to query specific data sources for selected parameters. In some embodiments, system parameters 544 may define one or more parameter monitors 562 to be instantiated on one or more system components to collect desired parameter data and provide it to system data collector 550.

System cost functions 546 may include interfaces, functions, and/or parameters for calculating system cost values from one or more parameters. For example, parameters selected from system parameters 544 and collected by system data collector 550 may be variables in one or more cost functions that convert the parameters into a cost function value associated with a storage path of interest. System cost functions 546 may include standard cost models for storage resources, computing resources, and network resources involved in each storage path. System cost functions 546 may generally reduce or simplify a plurality of component level parameters (from any level of the hierarchy) into aggregate cost values for use in comparing costs between storage paths and executing the logical rules associated with path selection. In some embodiments, system cost functions 546 may include functions based on processing cost, memory cost, read/write latency, idle time, network delay, network bandwidth, and/or other system parameters.

Path selection rules 548 may include interfaces, functions, and/or parameters for selecting and comparing system cost values to determine a preferred storage path, generally reflecting a storage policy defined for object storage system 500. For example, path selection rules 548 may compare the relative merits of different storage elements and their associated storage paths based on one or more system constraints that the user cares about. In some embodiments, path selection rules 548 may correspond to logical evaluations arranged in ordered decision tree for determining which storage path should be selected among a plurality of viable storage paths in a storage pool. For example, a series of logical rules for path selection may be defined in a rule set data structure to be executed by a rules engine for comparing possible storage paths and storage elements.

In some embodiments, path selection rules 548 may be grouped into specific policy sets and a user may be able to select a policy set rather than configuring individual rules. For example, path selection rules 548 may include a quality of service policy 548.1, a latency target policy 548.2, or a power saving policy 548.3.

Quality of service policy 548.1 may include a rule set for avoiding slow or unavailable storage elements, storage nodes, or other components during retrieval or storage of data requests. For example, the storage path cost values may include measured response time to prior requests sent to each storage element and the comparison will select the subset with the fastest response times in order to reduce overall latency for all requests. Quality of service policy 548.1 may also include an aggressive blacklisting policy for unresponsive storage elements and other components.

Latency target policy 548.2 may include a rule set for users and/or processes that issue storage requests requiring low latency. For example, the rule set may select the fastest path, similar to quality of service policy 548.1, but only for users and processes specifically designated to receive low latency treatment, while selecting a slower path for users and processes that do not require low latency (to preserve the faster paths for the low latency requests). In some embodiments, the low latency targets may be monitored and if latency for low latency requests exceeds a threshold value, normal requests may be delayed until the latency targets are again met for low latency requests.

Power saving policy 548.3 may include a rule set to optimize the power efficiency of a distributed storage system (DSS) by choosing storage paths that allow for storage and retrieval of data blocks in a power efficient way. For example, when storing a data object in 18 data blocks, where 8 are redundant, the storage paths may be selected to place a subset 5 data blocks in storage elements that can be put off-line to save power, such as a storage node or rack designated to go into a low power mode once the operation is complete. The other 13 data blocks remain available with low latency, of which only 10 are needed for retrieval requests. If needed, the 5 additional storage elements can be put back online or otherwise taken out of low power mode. The rule set may include the logical rules for selecting one or more of the offline storage paths, such as due to failures among the 13 active data blocks or exceeding a latency threshold, and thereby initiating those storage elements to return to active use.

In some embodiments, one or more policy rule sets in path selection rules 548 may include rules for storing redundant data blocks based on processing parameters and the comparative processing intensity of different data blocks, such as host data blocks versus parity data blocks. Some data blocks may require more processing during decoding operations than other data blocks. Some storage paths may be selected because they are associated with a low-level processing (such as host data blocks), while other storage paths may be selected because they are associated high-level processing (such as parity calculation). For example, parity data blocks may intentionally be sent to storage elements that are already associated with a high resource cost (such as high latency) and would not normally be selected over lower latency storage paths. Because of the high resource cost, the parity data block is unlikely to be selected for subsequent storage requests in favor of the data blocks stored to storage elements with a lower resource cost (such as low latency). This policy may essentially reserve the use of high processing cost blocks to situations where the low processing cost blocks can no longer fulfill the incoming requests, which may in turn reduce latency and power consumption, at least until the threshold of needing the high processing cost blocks is passed.

System data collector 550 may include interfaces, functions, and/or parameters for receiving and/or accessing system parameters for use in selecting storage paths and storage elements for redundant data blocks. For example, system data collector 550 may include a service for collecting latency data from storage requests processed through object storage system 500 and components thereof. Read and write operations may generate messages and/or log entries that may be used to calculate elapsed times between the initiating and completion of read or write requests to storage elements and these processing times may be aggregated in monitoring data 594 by system data collector 550.

In some embodiments, components at various levels of the hierarchy may be configured to collect performance data regarding storage operations, workload, processor use, memory use, network delay, bandwidth, and/or system status. System data collector 550 may be configured to receive system parameter values corresponding to some or all system parameters through a reporting or messaging function and/or access to data structures or memory locations storing these values. System data collector 550 may aggregate collected information in monitoring data 594 for use by storage path estimator 552 and/or storage path selector 556. In some embodiments, some parameter values may be refreshed upon request or responsive to an action, such as completing the processing of a prior storage request. Some parameter values may be refreshed periodically at a time interval that provides acceptable accuracy for cost model calculation without overburdening the system with traffic related to parameter value messages or queries.

In some embodiments, system data collector 550 may be configured for communication with parameter monitors 562. For example, parameter monitors 562 may include hardware and/or software data collectors disposed in individual system components, such as storage elements, storage nodes, top switches, controllers, network devices, etc. for collecting parameter data from their respective components and/or adjacent components. Parameter monitors 562 may be selectively installed in networked components and registered with system data collector 550 for aggregating system parameter values in monitoring data 594. As with some configurations of system data collector 550, parameter monitors 562 may be configured to monitor specific transactions, mine log data, and/or access system parameters already generated and stored by their host system components for aggregation in monitoring data 594.

Storage path estimator 552 may include interfaces, functions, and/or parameters for calculating cost values for each storage element and/or related storage path for use in selecting storage paths and storage elements for redundant data blocks. For example, storage path estimator 552 may implement system cost functions 546 based on system parameters 544 collected by system data collector 550 and stored in monitoring data 594 to calculate and store storage path costs 596 for each storage element in a storage pool (for storage commands) or containing a redundant data block for a requested data object (for retrieval commands). In some embodiments, storage path estimator 552 may implement a dynamic cost model that may aggregate a plurality of system parameters into a multivariable transfer function for quantifying a system cost value. For example, rather than directly comparing latency values measured for each storage element, the relative system cost value for each storage element may be a weighted composite of a plurality of cost factors selected from storage costs, computing costs, and/or network costs. In some embodiments, system hierarchy model 542 may enable the factors to be calculated at each hierarchy level and selected for each storage path cost based on the hierarchical addressing scheme. For example, based on a storage element's hierarchical address, parameter values for the storage element, storage node, rack, and site may be selected for the storage path calculation. Note that storage path estimator 552 may use the most recent system parameters available to estimate the storage path costs, but the costs may only be estimates and the actual costs incurred by the resulting storage transaction on the selected storage paths may be different.

In some embodiments, storage path estimator may include a cost calculator 554 that executes system cost functions 546 that embody a particular cost model. For example, storage path estimator 552 may select a defined set of system parameters and one or more system cost functions for a path selection task. Storage path estimator 552 may provide the parameter sets for each storage path and the selected system cost function(s) to cost calculator 554. Cost calculator 554 may process each parameter set to generate a system cost value for each storage element and store the system cost value and a storage element identifier (such as its hierarchical address) for each storage path in a table, array, or similar data structure in storage path costs 596.

Storage path selector 556 may include interfaces, functions, and/or parameters for selecting the set of storage elements to receive redundant data blocks for storage requests and/or the subset of storage elements from which redundant data blocks are retrieved for retrieval requests. For example, storage path selector 556 may use the system cost values calculated by storage path estimator 552 to evaluate which storage elements should be used by block spreader 532 or block clusterer 534. Storage path selector 556 may include cost comparator 558 for comparing the relative system cost values of the candidate storage elements and related storage paths. For example, assuming a system cost value where a lower cost is better than a higher cost, cost comparator 558 may sequentially compare the system cost values from storage path costs 596 and/or sort those values into an ordered list, so that the set of storage elements with the lowest cost and meeting the number of storage elements needed for the operation may be determined. Storage path selector 556 may then return the selected set of storage elements to block spreader 532 or block clusterer 534 for use in completing the related operations. Based on a selected system cost function or dynamic cost model that returns a relative storage cost value, cost comparator 558 may identify the lowest cost (or highest cost) storage paths for storage path selector 556.

In some embodiments, storage path selector 556 may include a selection rules engine 560 for making more complex logical determinations to implement storage policy rules in storage policy data 592. For example, selection rules engine 560 may execute a set of path selection rules, such as path selection rules 548, using storage path costs 596 and a decision tree to select storage elements. A set of path selection rules may include a plurality of logical steps that eliminate or select storage elements based on considerations beyond their relative storage path costs alone. For example, selection rules may enforce special considerations of storage elements to use or not use due to load, maintenance status, or power-saving mode. Selection rules may use a classification of a data unit as low cost (host data) or high cost (parity data) to enforce different selection criteria. In some embodiments, storage path costs 596 may include multiple values for different cost types (such as storage costs, computing costs, and network costs) for each storage path and selection rules may determine which values are used and how they are weighted for cost comparator 558. For example, a given storage policy may select storage elements with the lowest storage costs that do not also have computing costs or network costs over particular thresholds.

Memory 516 may include additional logic and other resources (not shown) for processing object data requests, such as modules for generating, queueing, and otherwise managing object data requests. Processing of an object data request by storage interface 520 may include any number of intermediate steps that yield at least one data request to the distributed storage system.

Figure 6:
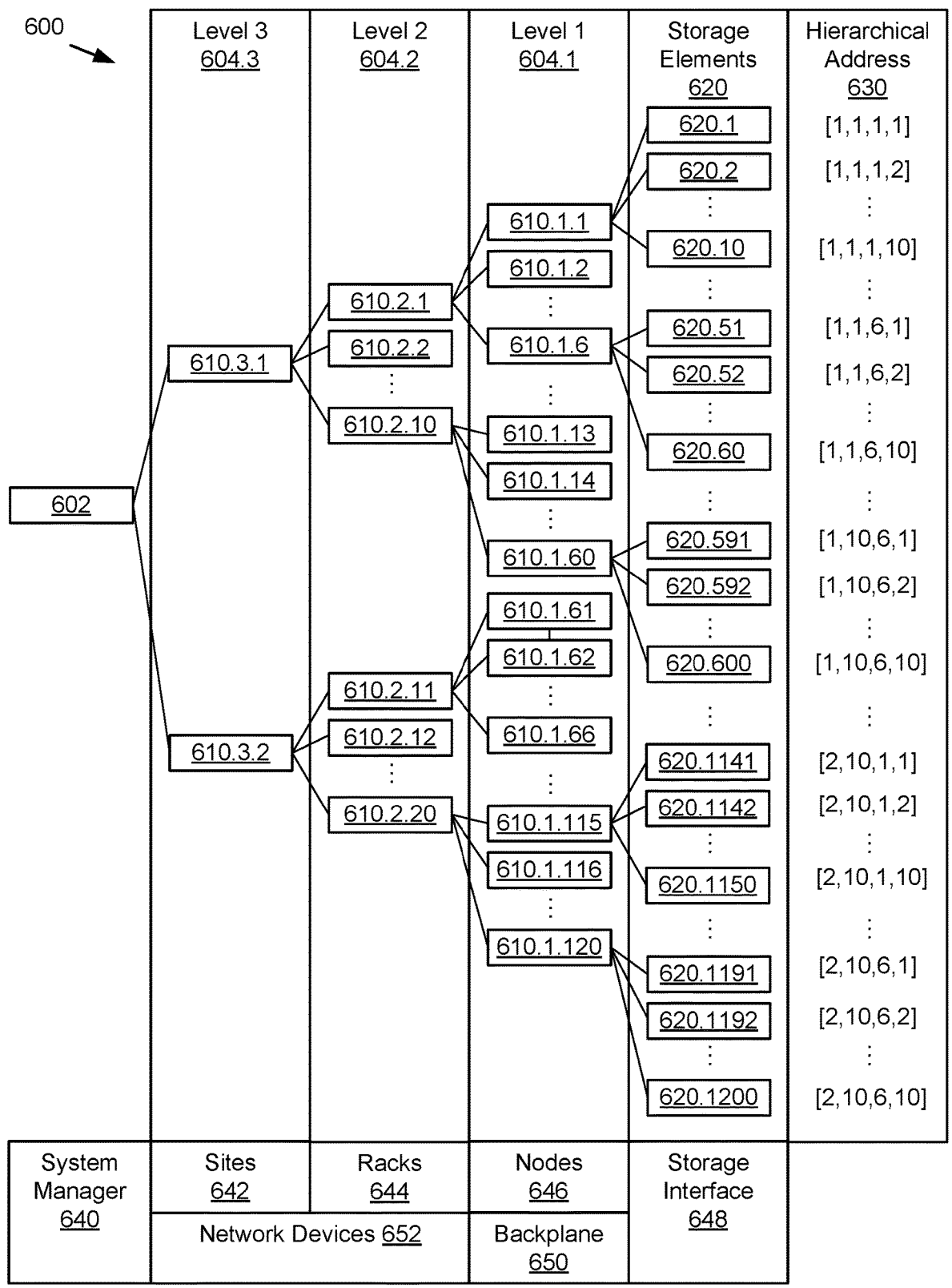
FIG. 6 schematically illustrates example storage system components in a hierarchical addressing configuration.

FIG. 6 shows an example hierarchical model of a distributed storage system 600, similar to distributed storage system 1 and its components, as described in FIGS. 1-4. The various levels 604 of the hierarchical configuration of the components of distributed storage system 600 form a tree structure and the path from controller node 602 to each storage element 620 forms a unique storage path associated with that storage element.

At the first hierarchy level 604.1, storage elements 620 are grouped into first components 610.1, such as storage nodes 646. In the example shown, each storage node component 610.1 may include ten storage elements 620, such as drives, and the 1200 storage elements correspond to 120 distinct storage nodes. In some embodiments, storage elements 620 may be communicatively connected to storage nodes 646 over their respective storage interfaces 648.

At the second hierarchy level 604.2, storage elements 620 may be further grouped into second components 610.2, such as storage racks 644. In the example shown, each storage rack component 610.2 may include six storage node components 610.1 and the 120 storage nodes may be grouped into 20 distinct storage racks. In some embodiments, storage nodes 646 may be connected to storage racks 644 by a backplane 650 including one or more network connections from a rack switch or similar component to each storage node.

At the third hierarchy level 604.3, storage elements 620 may be further grouped into third components 610.3, such as sites 642. In the example shown, each site component 610.3, which may represent a site network configuration and related equipment, may include ten storage rack components 610.2 and the 20 storage racks may be grouped into two distinct sites. In some embodiments, storage racks 644 may be connected into sites 642 by network devices 652, such as routers, switches, and network management devices.

A system manager 640 may be hosted in controller 602 for overseeing storage requests to distributed storage system 600. In some embodiments, controller 602 may host elements similar to those shown in memory 516 of FIG. 5 for managing storage requests and encoding them to and decoding them from an object data store comprised of distributed storage elements 620.

In some embodiments, distributed storage system 600 may use hierarchical addresses 630 for identifying individual storage elements. Each storage element 620 may comprise a corresponding unique storage element identifier that is a hierarchical address. For example, the hierarchical address of storage element 620.1 is [1,1,1,1] and the hierarchical address of storage element 620.1200 is [2,10,6,10].

In some embodiments, each hierarchical address may be comprised of several component identifiers that identify the corresponding hierarchical path configuration for each storage element 620. These component identifiers may each occupy a position that is a hierarchy level identifier. For example, each hierarchical address may be an array of four numerals. The left most or first numeral in the array may be a hierarchy level identifier and contain a component identifier for components 610.3 in hierarchy level 3. The next numeral in the array moving right may be a hierarchy level identifier and contain a component identifier for components 610.2 in hierarchy level 2. The next numeral on the array moving right again may be a hierarchy level identifier and contain a component identifier for components 610.1 in hierarchy level one. The right most numeral is a component identifier for storage elements 620 and may be considered not to be a hierarchy level identifier or to identify hierarchy level 0, the storage elements themselves.

Hierarchical addresses 630 may identify a storage path by reference to the specific components at each hierarchy level that data blocks will pass through between controller 602 and each storage element 620. The example shown includes three hierarchy levels resulting in a four-number array of hierarchy level identifiers to describe the address and storage path. Other hierarchical storage models may include more or fewer hierarchy levels and the number of identifiers in the address may generally equal the number of hierarchy levels plus one for the storage element identifiers themselves. For example, some configurations may have only two hierarchy levels and others may have four or more. Example hierarchy level identifiers may include a storage element identifier, a storage node identifier, a storage rack identifier, a storage cluster identifier, a storage site identifier, and a storage system identifier, though other hierarchy level identifiers and corresponding component identifiers are possible.

Figure 7:
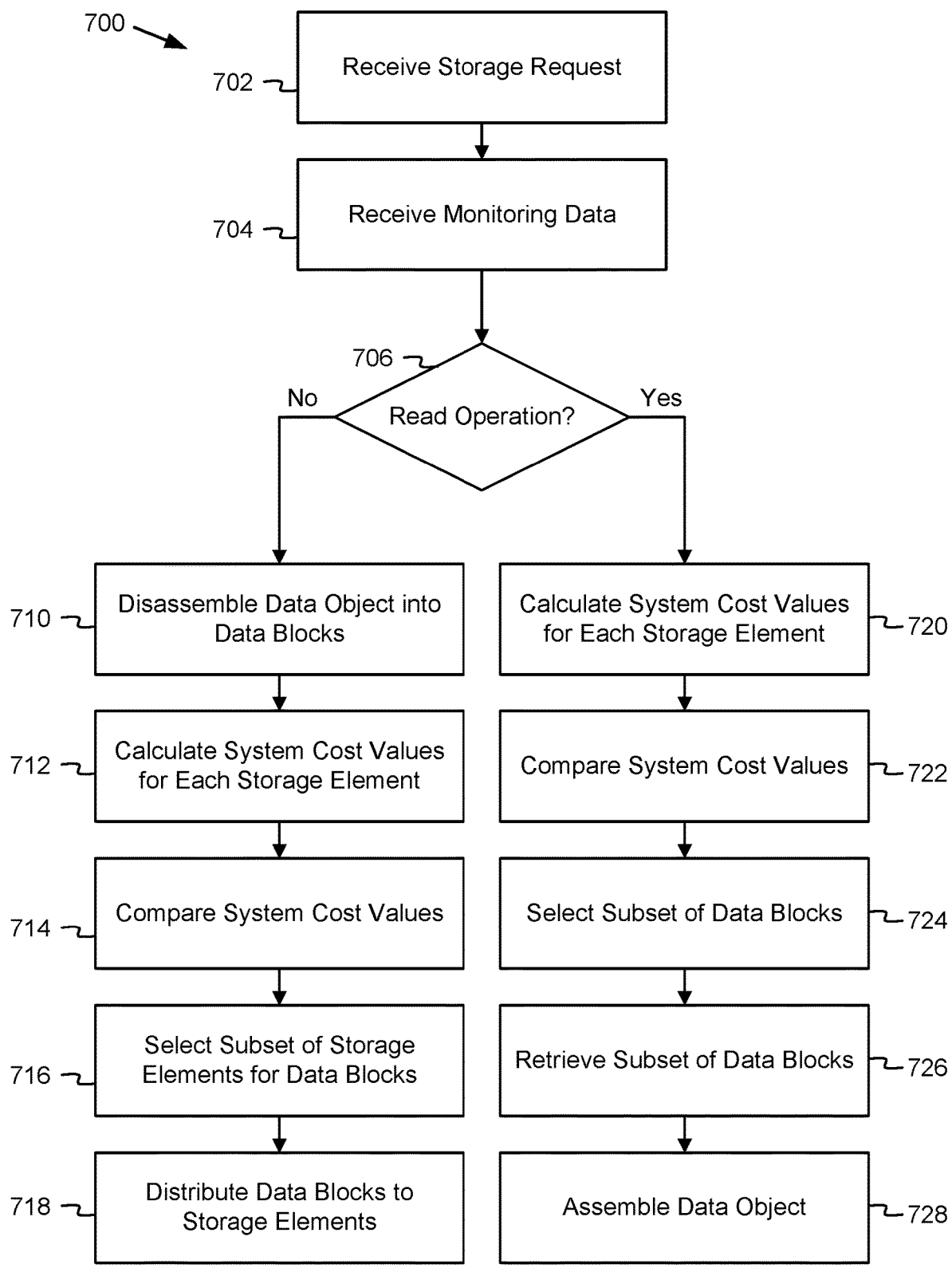
FIG. 7 illustrates an example method for executing storage requests based on system cost values.

As shown in FIG. 7, the object storage system 500 may be operated according to an example method for selecting storage elements based on system cost values, i.e. according to the method 700 illustrated by the blocks 702-728 of FIG. 7.

At block 702, a storage request may be received. For example, a client request handler may receive an object storage request that references one or more data objects for storage or retrieval.

At block 704, monitoring data may be received including one or more system parameters. For example, a system data collector may receive updated system parameters for storage elements in a storage pool relevant to the incoming data request. In some embodiments, block 704 may operate concurrently to block 702 with data request handling proceeding in parallel with monitoring system parameters relevant to one or more system cost values.

At block 706, whether the received storage request is a read operation may be evaluated. For example, the storage request handler may determine whether the storage operation is a put request (storage or write operation) or a get request (retrieval or read operation). If yes, the storage request includes a read operation and method 700 may proceed to block 720. If no, the storage request includes a write operation and method 700 may proceed to block 710.

At block 710, the data object may be disassembled into data blocks. For example, an encoder may divide the data object into a predetermined number of redundant data blocks using an erasure coding configuration.

At block 712, system cost values may be calculated for each storage element in a storage pool that will receive the data object. For example, a storage path estimator may identify each storage element in the storage pool and calculate an associated system cost value for the storage path to reach that storage element.

At block 714, system cost values may be compared to determine the relative costs of each storage element. For example, a storage path selector may compare the system cost values to sort the storage elements according to their relative costs and enable them to be grouped by higher or lower costs.

At block 716, a subset of storage elements in the storage pool may be selected to receive the data blocks. For example, the storage path selector may apply a path selection rule to select a number of storage elements equaling a desired spreading width and having the lowest relative costs.

At block 718, the data blocks may be distributed to the selected subset of storage elements. For example, a block spreader may store the data blocks to the selected subset of storage elements based on a spreading policy.

At block 720, system cost values may be calculated for each storage element in the set of storage elements containing data blocks for the data object. For example, the storage path estimator may identify each storage element with data blocks associated with the data object identifier and calculate an associated system cost value for the storage path to reach that storage element.

At block 722, system cost values may be compared to determine the relative costs of each storage element. For example, the storage path selector may compare the system cost values to sort the storage elements according to their relative costs and enable them to be grouped by higher or lower costs.

At block 724, a subset of data blocks equal to a number of data blocks needed to recover the data object may be selected based on their corresponding storage elements. For example, the storage path selector may apply a path selection rule to select a number of storage elements equaling a minimal spreading requirement and having the lowest relative costs.

At block 726, the data blocks may be retrieved from the selected subset of storage elements. For example, a block cluster may read the data blocks from the selected subset of storage elements and provide them to a decoder for assembly.

At block 728, the data object may be assembled from the retrieved data blocks. For example, the decoder may use the erasure coding configuration to decode the data in the data blocks and reassemble the original data object for the storage request.

Figure 8:
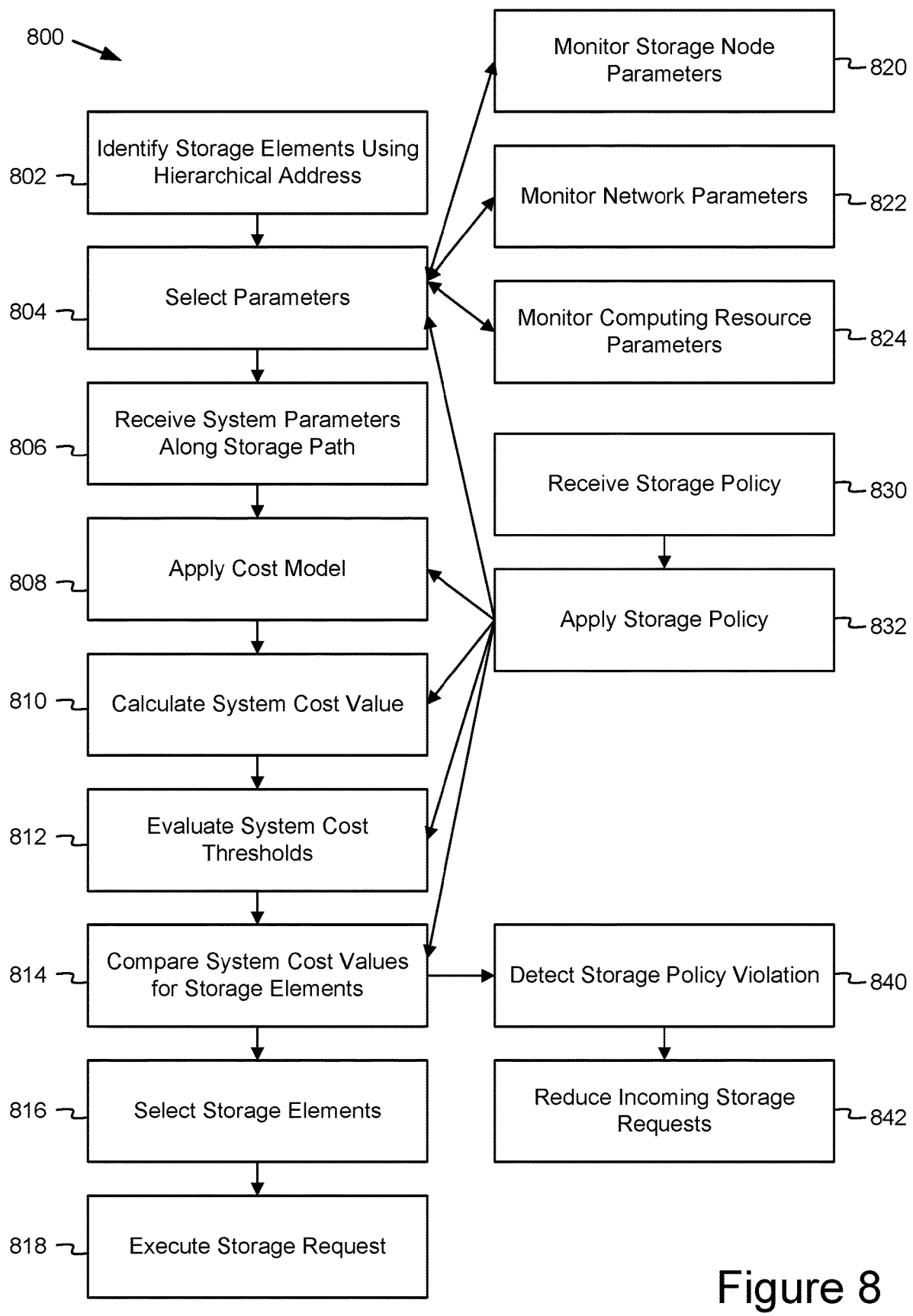
FIG. 8 illustrates an example method for dynamically selecting storage elements in a hierarchical distributed storage system.

As shown in FIG. 8, the object storage system 500 may be operated according to an example method for selecting storage elements for use in executing storage requests, i.e. according to the method 800 illustrated by the blocks 802-842 of FIG. 8. In some embodiments, method 800 may operate in conjunction with the example method 700 of FIG. 7 to support one or more blocks of method 700.

At block 802, storage elements may be identified using hierarchical addresses. For example, each storage element may include an address that identifies the hierarchy of components with which the storage element may be grouped (e.g. node, rack, site network, etc.). Erasure coding components, including storage path estimators and storage path selectors, may identify storage elements using the hierarchical addresses and advantageously use the storage path described by the address in selecting which storage elements to use for a given request.

At block 804, storage system and component parameters may be selected to support one or more cost models for the storage elements. For example, one or more storage policies and related cost models may define a set of parameters needed to estimate the relative system costs for each storage path and a storage policy engine may enable a user to select storage policies and/or cost models which the storage policy engine may translate into parameter selections for use by a system data collector.

At block 806, system parameters may be received along the hierarchical storage path. For example, parameters may be received by the system data collector from the storage element, controller, and/or one or more components along the storage path, using the hierarchical address to match the storage element with the associated component parameters.

At block 808, one or more cost models may be applied to the relevant parameters. For example, the storage path estimator may populate the variables in one or more cost functions for a selected cost model for each of the storage elements and corresponding storage paths being evaluated.

At block 810, a system cost value may be calculated for each storage path. For example, the storage path estimator may process the cost functions using the parameters for each of the storage elements and return a relative system cost value for each storage element identifier or address.

At block 812, system cost values may be evaluated against one or more system cost thresholds. For example, a storage policy may include logical rules requiring that latency, network lag, queue depths, or other system cost values not exceed defined thresholds and the storage path selector may evaluate these thresholds as part of the path selection rules for each storage operation.

At block 814, system cost values for each storage element may be compared to each other. For example, the storage path selector may compare the system cost values to sort the storage elements according to their relative costs and enable them to be grouped by higher or lower costs.

At block 816, a set of storage elements for the storage request may be selected. For example, the storage path selector may apply path selection rules based on both system cost thresholds and relative system costs between storage nodes to select a number of storage elements needed for the operation and meeting the criteria of the storage policy and related cost model and rules set.

At block 818, the storage request may be executed based on the selected set of storage elements. For example, the erasure encoded data blocks for a data object may be stored to the set of storage elements or retrieved from the storage elements.

In some embodiments, at blocks 820, 822, and 824, parameters may be monitored based on the selected parameters of block 804. At block 820, storage node parameters may be monitored, such as a read/write latency value received by the system data collector. At block 822, network parameters may be monitored, such as a network delay value for each component in the hierarchy received by the system data collector. At block 824, computing resource parameters may be monitored, such as a processor usage value or memory usage value from one or more components received by the system data collector.

In some embodiments, at blocks 830 and 832, a storage policy may be identified for application to the selection of storage elements. At block 830, the storage policy may be received or identified, such as by a storage policy engine. At block 832, the storage policy may be applied, such as by conversion into a set of cost models and path selection rules for the storage policy that may be used by the storage path estimator and/or the storage path selector.

In some embodiments, at blocks 840 and 842, a storage policy violation may be detected and enforced with a remedial action. At block 840, a storage policy violation may be detected. For example, the storage path selector may determine that no set of storage elements are available that meet the storage policy, such as due to system cost values exceeding one or more thresholds or other rules not being met. At block 842, a remedial action may be taken in response to the storage policy violation, such as a reduction if incoming storage requests. For example, responsive to a storage policy violation related to high request volume causing unacceptable levels of latency, the storage interface may reduce the number of incoming requests by denying some portion of them or redirecting them to another system until the related system cost values return to acceptable levels.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
a block spreader configured to distribute, based on a spreading policy, a plurality of data blocks to a plurality of storage elements distributed among a plurality of storage nodes, wherein:
the plurality of storage elements is configured to store the plurality of data blocks; and
the plurality of data blocks corresponds to a data object;
a storage path estimator configured to calculate at least one system cost value for a storage path to each storage element of the plurality of storage elements storing the plurality of data blocks, wherein:
the storage path for each storage element of the plurality of storage elements is configured to include a plurality of hierarchy levels corresponding to different system components in the storage path to that storage element; and
the at least one system cost value for the storage path is an aggregate cost value based on a plurality of system parameters from that storage element and the different system components in the storage path to that storage element;

a storage path selector configured to select, based on a comparison of the at least one system cost value for each storage element, a subset of the plurality of data blocks from which the data object is recoverable; and
a block clusterer configured to retrieve the subset of the plurality of data blocks.

2. The system of claim 1, further comprising:
an encoder configured to disassemble the data object into a predetermined number of redundant data blocks equal to a number of the plurality of data blocks; and
a decoder configured to assemble the data object from the subset of the plurality of data blocks.

3. The system of claim 1, wherein:
the storage path estimator is further configured to identify, using a hierarchical address, each storage element of the plurality of storage elements; and
the hierarchical address includes a plurality of hierarchy level identifiers corresponding to a hierarchical path from at least one controller node to a selected storage element.

4. The system of claim 3, wherein:
the plurality of hierarchy level identifiers is selected from a storage element identifier, a storage node identifier, a storage rack identifier, a storage cluster identifier, a storage site identifier, and a storage system identifier; and
the hierarchical address includes at least three hierarchy level identifiers.

5. The system of claim 3, further comprising:
a system data collector configured to receive the plurality of system parameters for the storage path to each storage element of the plurality of storage elements, wherein:
the hierarchical address identifies the different system components in the storage path to the selected storage element; and
the plurality of system parameters for the storage path to the selected storage element includes system parameters from the different system components.

6. The system of claim 5, wherein:
the storage path estimator is further configured to, for each storage element of the plurality of storage elements:
determine, using the hierarchy level identifiers, the different system components in the storage path for the selected storage element and corresponding system parameters for the different system components; and
calculate, based on the corresponding system parameters, the aggregate cost value; and
the different system components include system components from at least two hierarchy levels of the plurality of hierarchy levels.

7. The system of claim 5, wherein:
the plurality of system parameters is selected from processing cost, memory cost, read/write latency, idle time, network delay, and network bandwidth; and
the storage path estimator is further configured to apply a cost model for a selected set of system parameters from the plurality of system parameters to calculate the at least one system cost value for each storage element.

8. The system of claim 5, further comprising:
the plurality of storage nodes including the plurality of storage elements, wherein the plurality of storage nodes further includes at least one parameter monitor configured to send at least one system parameter of the plurality of system parameters to the system data collector;
at least one controller node comprising the block spreader, the storage path estimator, the storage path selector, the block clusterer, and the system data collector; and
at least one network device interconnecting the plurality of storage nodes and the at least one controller node, wherein at least one system parameter of the plurality of system parameters includes a network cost associated with communication, between the at least one controller node and each storage node of the plurality of storage nodes, through the at least one network device.

9. The system of claim 1, further comprising:
a policy engine configured to receive at least one storage policy selected from a quality of service policy, a latency target policy, and a power saving policy, wherein:
the storage path estimator is further configured to apply the at least one storage policy to calculating the at least one system cost value for each storage element of the plurality of storage elements; and
the storage path selector is further configured to apply the at least one storage policy to selecting the subset of the plurality of data blocks from which the data object is recoverable.

10. A computer-implemented method, comprising:
disassembling a data object into a plurality of data blocks;
distributing, based on a spreading policy, the plurality of data blocks to a plurality of storage elements distributed among a plurality of storage nodes;
calculating at least one system cost value for a storage path to each storage element of the plurality of storage elements storing the plurality of data blocks, wherein:
the storage path for each storage element of the plurality of storage elements is configured to include a plurality of hierarchy levels corresponding to different system components in the storage path to that storage element; and
the at least one system cost value for the storage path is an aggregate cost value based on a plurality of system parameters from that storage element and the different system components in the storage path to that storage element;
selecting, based on a comparison of the at least one system cost value for each storage element, a subset of the plurality of data blocks from which the data object is recoverable;
retrieving the subset of the plurality of data blocks; and
assembling the data object from the subset of the plurality of data blocks.

11. The computer-implemented method of claim 10, further comprising:
identifying, using a hierarchical address, each storage element of the plurality of storage elements, wherein the hierarchical address includes a plurality of hierarchy level identifiers corresponding to a hierarchical path from at least one controller node to a selected storage element.

12. The computer-implemented method of claim 11, wherein:
the plurality of hierarchy level identifiers is selected from a storage element identifier, a storage node identifier, a storage rack identifier, a storage cluster identifier, a storage site identifier, and a storage system identifier; and the hierarchical address includes at least three hierarchy level identifiers.

13. The computer-implemented method of claim 11, further comprising:
receiving the plurality of system parameters for the storage path to each storage element of the plurality of storage elements, wherein:
the hierarchical address identifies the different system components in the storage path to the selected storage element; and
the plurality of system parameters for the storage path to the selected storage element includes system parameters from the different system components.

14. The computer-implemented method of claim 13, further comprising:
determining, using the hierarchy level identifiers for each storage element of the plurality of storage elements, the different system components in the storage path for the selected storage element and corresponding system parameters for the different system components; and
calculating, for each storage element of the plurality of storage elements and based on the corresponding system parameters, the aggregate cost value, wherein the different system components include system components from at least two hierarchy levels of the plurality of hierarchy levels.

15. The computer-implemented method of claim 13, wherein:
the plurality of system parameters is selected from processing cost, memory cost, read/write latency, idle time, network delay, and network bandwidth; and
calculating the at least one system cost value for each storage element includes applying a cost model for a selected set of system parameters from the plurality of system parameters.

16. The computer-implemented method of claim 13, further comprising:
monitoring at least one system parameter of the plurality of system parameters at each storage node of the plurality of storage nodes; and
monitoring a network cost associated with communication between at least one controller node and each storage node of the plurality of storage nodes, wherein the network cost is at least one system parameter of the plurality of system parameters used for calculating the at least one system cost value.

17. The computer-implemented method of claim 10, further comprising:
receiving at least one storage policy selected from a quality of service policy, a latency target policy, and a power saving policy, wherein:
calculating the at least one system cost value for each storage element of the plurality of storage elements includes applying the at least one storage policy; and
selecting the subset of the plurality of data blocks from which the data object is recoverable includes applying the at least one storage policy.

18. The computer-implemented method of claim 17, further comprising:
detecting a policy violation based on the comparison of the at least one system cost value for each storage element not meeting the at least one storage policy; and
reducing, responsive to detecting the policy violation, incoming storage requests to the plurality of storage nodes.

19. A system, comprising:
a plurality of storage nodes including a plurality of storage elements;
at least one controller node configured to communicate with the plurality of storage nodes;
means for disassembling a data object into a plurality of data blocks;
means for distributing, based on a spreading policy, the plurality of data blocks to the plurality of storage elements distributed among the plurality of storage nodes;
means for calculating at least one system cost value for a storage path to each storage element of the plurality of storage elements storing the plurality of data blocks, wherein:
the storage path for each storage element of the plurality of storage elements is configured to include a plurality of hierarchy levels corresponding to different system components in the storage path to that storage element; and
the at least one system cost value for the storage path is an aggregate cost value based on a plurality of system parameters from that storage element and the different system components in the storage path to that storage element;
means for selecting, based on a comparison of the at least one system cost value for each storage element, a subset of the plurality of data blocks from which the data object is recoverable;
means for retrieving the subset of the plurality of data blocks; and
means for assembling the data object from the subset of the plurality of data blocks.

20. The system of claim 19, further comprising:
means for receiving at least one storage policy selected from a quality of service policy, a latency target policy, and a power saving policy, wherein:
the means for calculating the at least one system cost value for each storage element of the plurality of storage elements includes means for applying the at least one storage policy; and
the means for selecting the subset of the plurality of data blocks from which the data object is recoverable includes means for applying the at least one storage policy.

* * * * *